United States Patent
Son et al.

(10) Patent No.: US 12,377,762 B2
(45) Date of Patent: Aug. 5, 2025

(54) SYSTEM AND METHOD FOR CONTROLLING MOTOR-DRIVEN CHILD SEAT FOR VEHICLE

(71) Applicants: Hyundai Motor Company, Seoul (KR); Kia Corporation, Seoul (KR)

(72) Inventors: Byeong Seon Son, Seoul (KR); Tae Hoon Lee, Suwon-Si (KR); Ji Hwan Kim, Seoul (KR); Seon Chae Na, Yongin-Si (KR); Sang Ho Kim, Incheon (KR); Sang Hoon Park, Incheon (KR); Won Ho Chang, Cheonan-Si (KR); Hyun Tae Lee, Cheonan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 378 days.

(21) Appl. No.: 18/082,383

(22) Filed: Dec. 15, 2022

(65) Prior Publication Data

US 2023/0294574 A1 Sep. 21, 2023

(30) Foreign Application Priority Data

Mar. 16, 2022 (KR) .......................... 10-2022-0032426

(51) Int. Cl.
*B60N 2/28* (2006.01)
*B60N 2/02* (2006.01)
*B60N 2/56* (2006.01)

(52) U.S. Cl.
CPC ....... *B60N 2/2869* (2013.01); *B60N 2/02246* (2023.08); *B60N 2/2875* (2013.01); *B60N 2/5678* (2013.01); *B60N 2/0264* (2023.08); *B60N 2/0268* (2023.08)

(58) Field of Classification Search
None
See application file for complete search history.

(56) References Cited

U.S. PATENT DOCUMENTS

| 10,629,056 | B1 * | 4/2020 | Forest ................ G08B 21/0252 |
| 2008/0054695 | A1 | 3/2008 | Lhomme et al. |
| 2016/0304004 | A1 * | 10/2016 | Sandbothe ............. B60N 2/286 |
| 2019/0215672 | A1 * | 7/2019 | Orris ........................ H04W 4/38 |
| 2022/0297579 | A1 * | 9/2022 | Nilsson ................ B60N 2/0021 |

FOREIGN PATENT DOCUMENTS

| EP | 1791720 B1 | 4/2014 |
| JP | 2019-073242 A | 5/2019 |
| KR | 10-1565107 B | 11/2015 |
| KR | 2021-0089009 A | 7/2021 |

* cited by examiner

*Primary Examiner* — Lail A Kleinman
(74) *Attorney, Agent, or Firm* — Morgan, Lewis & Bockius LLP

(57) ABSTRACT

A system and method for controlling a motor-driven child seat for a vehicle, may easily allow a seat control unit to perform the power supply and drive control for various electric parts of the motor-driven child seat by connecting between the seat control unit configured to control various electric parts of a vehicle seat and various electric parts of the motor-driven child seat using a connector so that power supply and control signals may be exchanged therebetween when the motor-driven child seat is mounted on the vehicle seat.

19 Claims, 9 Drawing Sheets

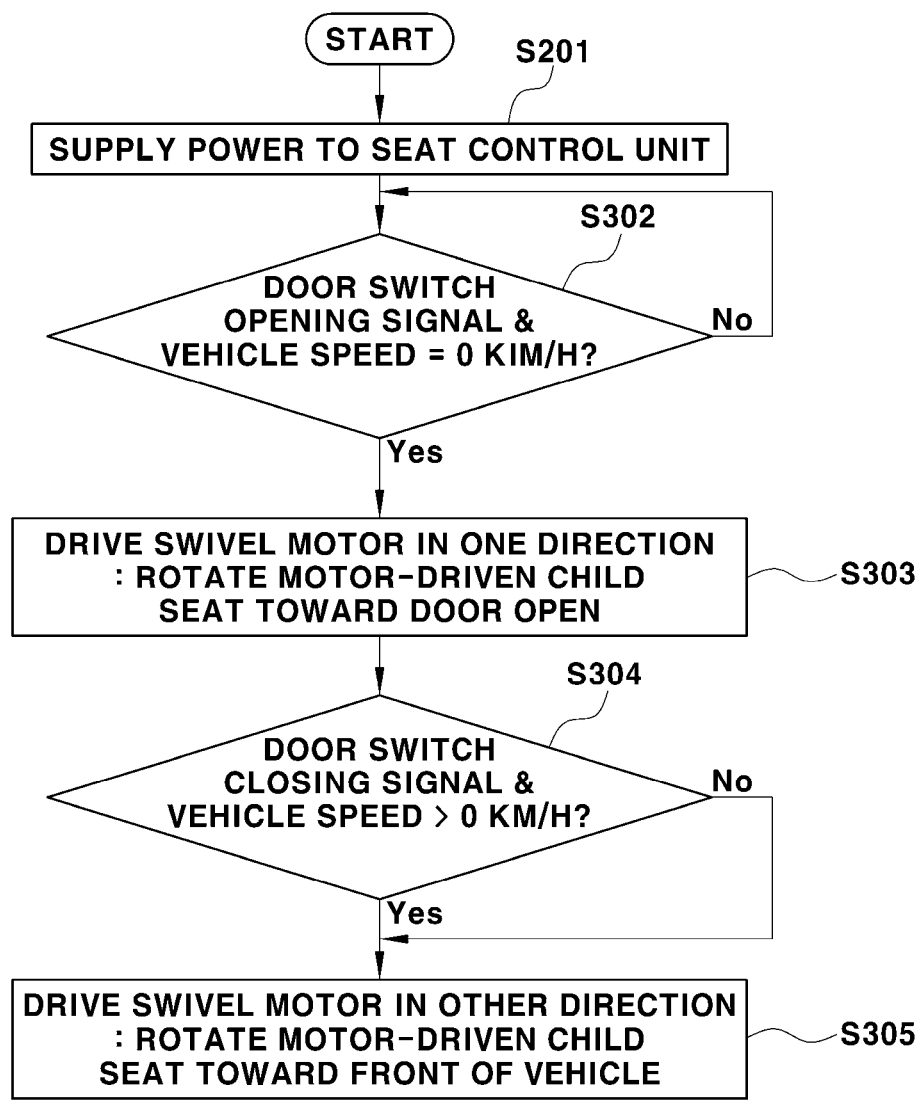

SYSTEM AND METHOD FOR CONTROLLING MOTOR-DRIVEN CHILD SEAT FOR VEHICLE

CROSS-REFERENCE TO RELATED APPLICATION

The present application claims priority to Korean Patent Application No. 10-2022-0032426 filed on Mar. 16, 2022, the entire contents of which is incorporated herein for all purposes by this reference.

BACKGROUND OF THE PRESENT DISCLOSURE

Field of the Present Disclosure

The present disclosure relates to a system and method for controlling a motor-driven child seat for a vehicle, and more specifically, to a system and method for controlling a motor-driven child seat for a vehicle, which may selectively operate various electric parts of the motor-driven child seat using a seat control unit configured to control electric parts of a vehicle seat.

Description of Related Art

In general, as the essential installation of a child seat for a vehicle is legalized when a child rides, the spread of the child seat is rapidly increasing.

As the conventional manual child seat is manufactured in a structure that makes it difficult to adjust a seat position, there is a disadvantage in that adults feel uncomfortable in an operation of holding and seating children on the child seat, and furthermore, children refuse to sit or feel uncomfortable after sitting.

Accordingly, a motor-driven child seat including a reclining adjustment motor and a swivel adjustment motor of the child seat is being developed to improve the convenience of seating and convenience of switching to a comfortable posture for children.

Furthermore, the motor-driven child seat is manufactured in a structure that has a ventilation blower and a ventilation mat having a built-in heating wire to provide a comfortable seating environment to children.

Furthermore, the motor-driven child seat is manufactured in a structure having a power supply connector to easily supply power to a ventilation device, a heating wire device, or the like as well as a motor-driven mechanism including a motor, which is a power consumption part, or the like in a state in which the motor-driven child seat is fixed to a vehicle seat or the like.

Meanwhile, there is a demand for an appropriate control system and method for various electric parts (reclining adjustment motor, swivel adjustment motor, ventilation blower, heating wire, and the like) of the motor-driven child seat in a state in which the motor-driven child seat is mounted on the vehicle seat so that power may be supplied.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system and method for controlling a motor-driven child seat for a vehicle, which may allow a seat control unit to easily perform a power supply and a driving control for various electric parts of the motor-driven child seat by connecting the seat control unit configured to control various electric parts of a vehicle seat to various electric parts of the motor-driven child seat using a connector so that power may be supplied and a drive control signal may be transmitted when the motor-driven child seat is mounted on the vehicle seat.

To achieve the object, according to an exemplary embodiment of the present disclosure, there is provided a system for controlling a motor-driven child seat for a vehicle including: a seat control unit of power supply and drive control for electric parts of a vehicle seat or electric parts of the motor-driven child seat; a plurality of operation request units connected to an input terminal of the seat control unit; a first connector mounted on the vehicle seat, and connected to an output terminal of the seat control unit; and a second connector mounted on the motor-driven child seat, and connected to an input terminal of the motor-driven child seat, in which when the first connector and the second connector are fastened to each other, power supply and drive control signals may be transmitted to the electric parts of the motor-driven child seat from the seat control unit.

The plurality of operation request units includes: a vehicle switch directly operable by a driver; a CAN bus connected to the seat control unit and configured to transmit a voice signal and a vehicle information detection signal to the seat control unit; and a smart device connected to the seat control unit of wireless communication.

The seat control unit includes a first seat control unit configured to transmit the power supply and drive control signals to a second heater mat and a second ventilation blower mounted on the motor-driven child seat in addition to the first heater mat and the first ventilation blower mounted on the vehicle seat, and determine whether the first connector and the second connector are fastened to each other; and a second seat control unit configured to transmit the power supply and drive control signals to a reclining adjustment motor and a swivel motor mounted on the motor-driven child seat in addition to a seat position adjustment motor mounted on the vehicle seat.

The first connector is provided with a 1-1st detection pin connected to the first seat control unit by a conductive line and a 1-2nd detection pin connected to the first seat control unit by a ground line, and the second connector is provided with a second detection pin conductively coming into contact with the 1-1st detection pin and the 1-2nd detection pin.

When the first seat control unit detects a ground signal when the 1-1st detection pin and the 1-2nd detection pin of the first connector conductively come into contact with the second detection pin of the second connector, the first seat control unit is configured to conclude that the first connector and the second connector have been conductively fastened.

When the second seat control unit receives a door opening signal from a door switch and at the same time, receives a vehicle stop signal from a vehicle speed sensor, the second seat control unit is configured to transmit the power supply and drive control signals for rotating the motor-driven child seat toward a door to the swivel motor.

When the second seat control unit receives a door closing signal from the door switch and at the same time, receives a vehicle speed detection signal of 1 km/h or more from the vehicle speed sensor, the second seat control unit is configured to transmit the power supply and drive control signals for rotating the motor-driven child seat toward a front of the vehicle to the swivel motor.

To achieve the object, according to another exemplary embodiment of the present disclosure, there is provided a method of controlling a motor-driven child seat for a vehicle, the method including: supplying power to a seat control unit; determining whether there is an operation request for electric parts of a vehicle seat or electric parts of the motor-driven child seat by the seat control unit; determining whether a first connector mounted on the vehicle seat and a second connector mounted on the motor-driven child seat are fastened by the seat control unit when the seat control unit concludes that there is the operation request; applying power supply and drive control signals to the electric parts of the motor-driven child seat by the seat control unit when it is determined that the first connector and the second connector have been fastened to each other; and applying the power supply and drive control signals to the electric parts of the vehicle seat by the seat control unit when the seat control unit concludes that the first connector and the second connector have not been fastened.

When the seat control unit detects a ground signal when a 1-1st detection pin and a 1-2nd detection pin of the first connector conductively come into contact with a second detection pin of the second connector, the seat control unit is configured to conclude that the first connector and the second connector have been conductively fastened.

When the seat control unit does not detect the ground signal when the 1-1st detection pin and the 1-2nd detection pin of the first connector conductively come into contact with the second detection pin of the second connector, the seat control unit is configured to conclude that the first connector and the second connector have not been fastened.

When there is an operation request for a second heater mat or a second ventilation blower among the electric parts of the motor-driven child seat, the power supply and drive control signals are applied to the second heater mat or the second ventilation blower of the motor-driven child seat when the first connector and the second connector are in a state of being fastened, and the power supply and drive control signals are applied to a first heater mat or a first ventilation blower of the vehicle seat when the first connector and the second connector are in a state of not being fastened.

When there is an operation request for a reclining adjustment motor among the electric parts of the motor-driven child seat, the power supply and drive control signals are applied to the reclining adjustment motor of the motor-driven child seat when the first connector and the second connector are in a state of being fastened, and the power supply and drive control signals are applied to a seatback reclining adjustment motor and a seat cushion tilting motor of the vehicle seat when the first connector and the second connector are in a state of not being fastened.

When the seat control unit receives a door opening signal from a door switch and at the same time, receives a vehicle stop signal from a vehicle speed sensor, the seat control unit is configured to apply the power supply and drive control signals for rotating the motor-driven child seat toward a door to a swivel motor of the motor-driven child seat.

When the seat control unit receives a door closing signal from the door switch and at the same time, receives a vehicle speed detection signal indicating that a vehicle speed exceeds 0 km/h from the vehicle speed sensor, the seat control unit is configured to apply the power supply and drive control signals for rotating the motor-driven child seat toward a front of the vehicle to the swivel motor of the motor-driven child seat.

Through the above configuration, the present disclosure provides the following effects.

First, it is possible to provide the convenience that enables the seat control unit to perform the power supply and drive control for various electric parts of the motor-driven child seat by connecting between the seat control unit provided on the vehicle seat and various electric parts of the motor-driven child seat using the connector so that power supply and control signals may be exchanged therebetween.

Second, the separate control unit and switches for controlling the electric parts of the child seat are not required, and it is possible to provide the control convenience for various electric parts of the child seat by allowing the power supply and drive control for various electric parts of the motor-driven child seat to be performed by use of the switches and the seat control unit of controlling various electric parts of the vehicle seat.

Third, it is possible to provide the convenience for children to sit on or get off the child seat by allowing the seat control unit to automatically perform the drive control of swiveling the child seat toward the door open when the door is open and the vehicle stops, and allowing the seat control unit to automatically perform the drive control of swiveling the child seat to the normal seating position when the door is closed and the vehicle travels.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 10 is a flowchart showing yet another example of the method of controlling the motor-driven child seat for the vehicle according to an exemplary embodiment of the present disclosure.

Figure 1:
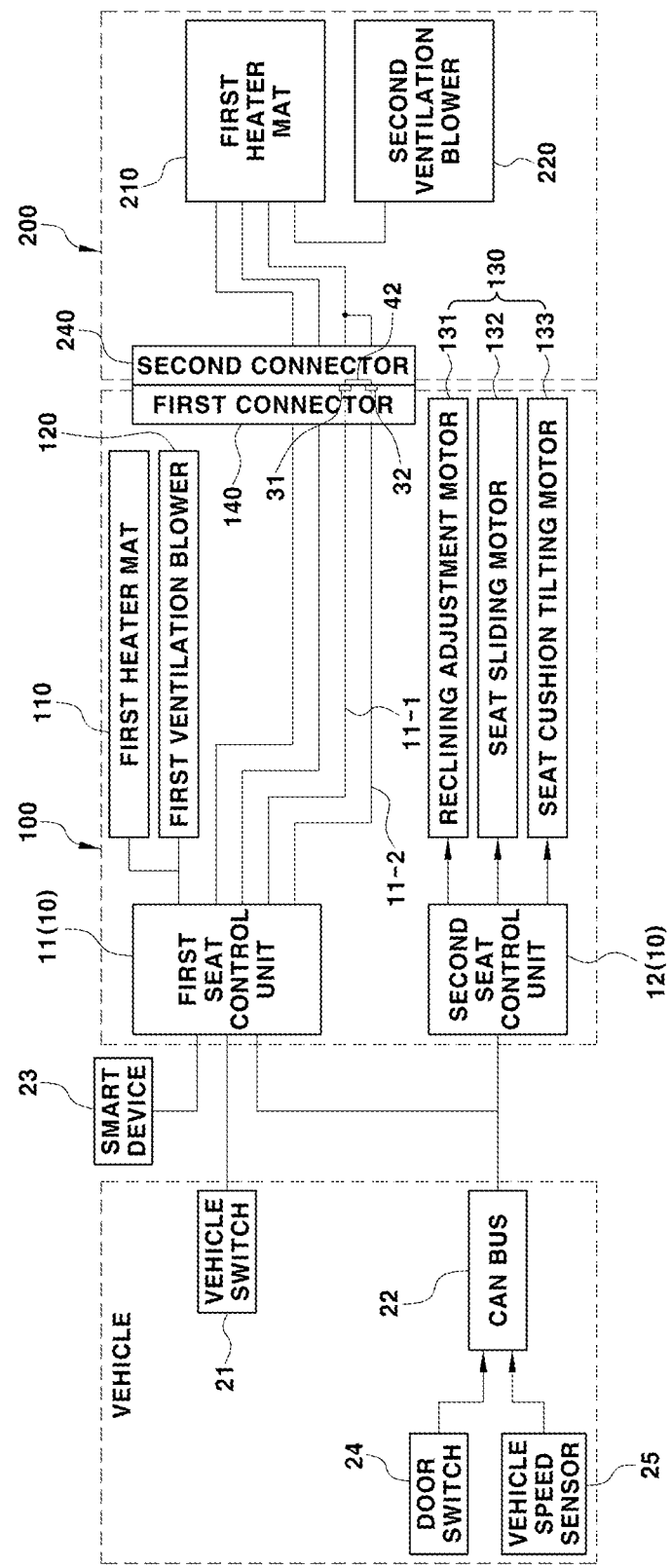
FIG. 1 and FIG. 2 are configuration views showing a system for controlling a motor-driven child seat for a vehicle according to an exemplary embodiment of the present disclosure.

It should be understood that the appended drawings are not necessarily to scale, presenting a somewhat simplified representation of various exemplary features illustrative of the basic principles of the present disclosure. The predetermined design features of the present disclosure as disclosed herein, including, for example, predetermined dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments of the present disclosure will be described in detail with reference to the accompanying drawings.

Figure 2:
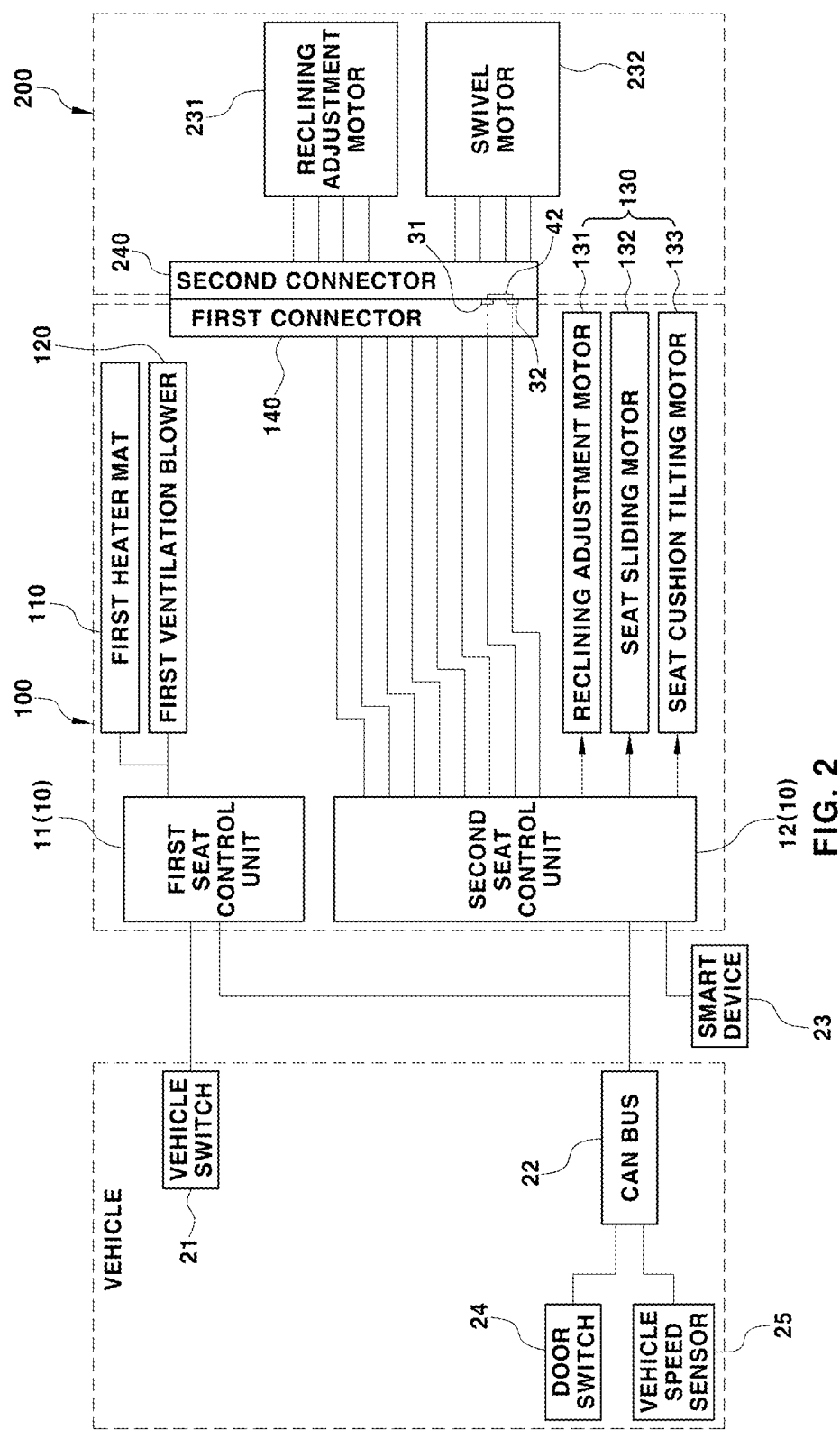
Figure 3:
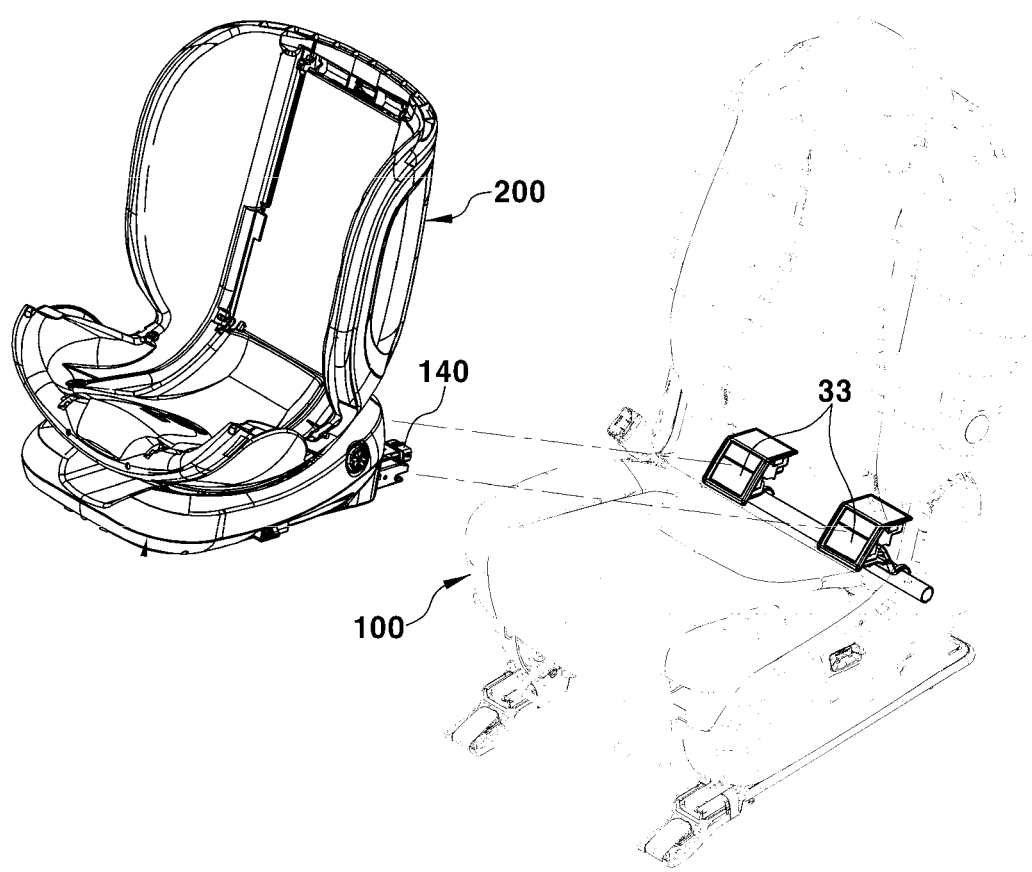
FIG. 3 is a perspective view showing the motor-driven child seat for the vehicle according to an exemplary embodiment of the present disclosure and a vehicle seat.

FIG. 1 and FIG. 2 are configuration views showing a system for controlling a motor-driven child seat for a vehicle according to an exemplary embodiment of the present disclosure, and FIG. 3 is a perspective view showing the motor-driven child seat for the vehicle according to an exemplary embodiment of the present disclosure and a vehicle seat.

As shown in FIG. 1 and FIG. 2, a vehicle seat 100 includes a seat control unit 10 for power supply and drive control for various electric parts mounted on the vehicle seat.

The vehicle seat 100 as an electric part has a first heater mat 110 for heating and a first ventilation blower 120 for cooling built therein, and also has a seat position adjustment motor 130 including a reclining adjustment motor 131 configured to adjust an angle of a seatback, a seat sliding motor 132 configured to adjust a forward-rearward position of a seat, a seat cushion tilting motor 133 configured to tilt the seat cushion, and the like mounted thereon.

As shown in FIG. 3, a motor-driven child seat 200 may be accommodated on the vehicle seat 100 for safe seating of children.

Unlike the conventional manual type child seat, the motor-driven child seat 200 may have a second heater mat 210 for heating and a second ventilation blower 220 for cooling built therein, and also have a reclining adjustment motor 231 for adjusting an angle of the child seat and a swivel motor 232 for a swivel operation of the child seat mounted thereon.

According to an exemplary embodiment of the present disclosure, the seat control unit 10 is configured to perform the power supply and drive control for the first heater mat 110, the first ventilation blower 120, the seat position adjustment motor 130 including the reclining adjustment motor 131 and the seat sliding motor 132, and the like, and is also configured to perform the power supply and drive control for the second heater mat 210, the second ventilation blower 220, the reclining adjustment motor 231, and the swivel motor 232.

The seat control unit 10 may include a first seat control unit 11 and a second seat control unit 12 for a smooth control of a plurality of electrical parts.

To the present end, the first seat control unit 11 may be configured to transmit power supply and drive control signals to the second heater mat 210 and the second ventilation blower 220 mounted on the motor-driven child seat 200 in addition to the first heater mat 110 and the first ventilation blower 120 mounted on the vehicle seat 100, and determine whether a first connector 140 and a second connector 240, which will be described later, are fastened.

Furthermore, the second seat control unit 12 may be configured to transmit power supply and drive control signals to the reclining adjustment motor 231 and the swivel motor 232 mounted on the motor-driven child seat 200 in addition to the seat position adjustment motor 130 mounted on the vehicle seat 100.

Because a plurality of operation request units are connected to an input terminal of the seat control unit 10, the plurality of operation request units include a vehicle switch 21 directly operable by a driver, a CAN bus 22 configured to transmit a voice command signal and a vehicle information detection signal (e.g., opening and closing signals of a door switch or a vehicle speed detection signal) to the seat control unit 10, a smart device 23 connected to the seat control unit 10 for wireless communication, and the like.

For reference, the CAN bus refers to a controller area network (CAN) communication line through which a sensor signal may be transmitted to a control unit without a host computer in the vehicle.

Accordingly, when any one operation request signal among an operation signal of the vehicle switch 21, the vehicle information detection signal of the CAN bus 22, and an operation signal of the smart device 23 is input to the seat control unit 10, the power supply and drive control for at least one of the first heater mat 110, the first ventilation blower 120, the seat position adjustment motor 130 including the reclining adjustment motor 131, the seat sliding motor 132, and the seat cushion tilting motor 133, the second heater mat 210, the second ventilation blower 220, the reclining adjustment mat 231, and the swivel motor 232 may be performed.

Figure 4:
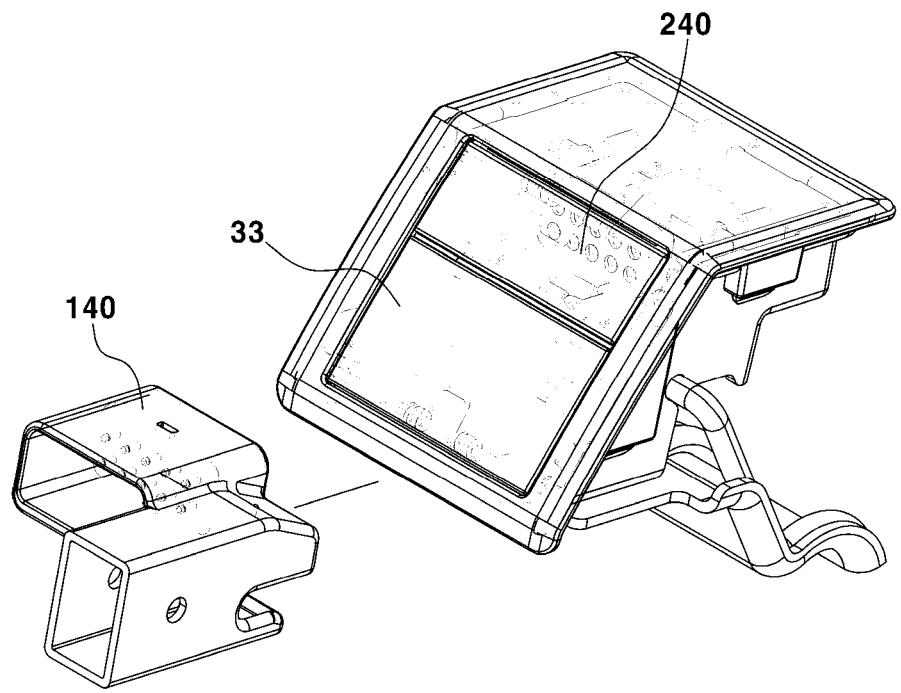
FIG. 4 is a perspective view showing an example of a second connector of the motor-driven child seat for the vehicle according to an exemplary embodiment of the present disclosure and a first connector of the vehicle seat.

Meanwhile, as shown in FIG. 3 and FIG. 4, the first connector 140 connected to an output terminal of the seat control unit 10 is mounted on the vehicle seat 100, and as shown in FIG. 3 and FIG. 4, the second connector 240 connected to input terminals of electric parts of the motor-driven child seat is mounted on the motor-driven child seat 200.

The first connector 140 may be protected by a cover member 33 rotatably mounted to the vehicle seat 100 without being exposed externally.

Figure 5:
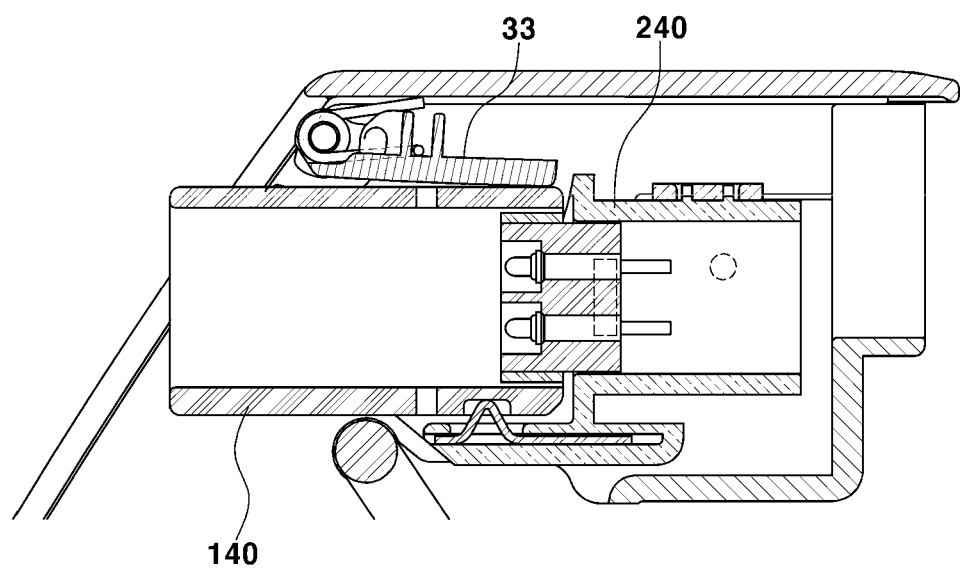
FIG. 5 is a cross-sectional view showing a fastened state between the second connector of the motor-driven child seat for the vehicle according to an exemplary embodiment of the present disclosure and the first connector of the vehicle seat.

Accordingly, when the motor-driven child seat 200 is accommodated on the vehicle seat 100 and as shown in FIG. 5, the second connector 240 is conductively inserted into and fastened to the first connector 140 by passing through the cover member 33, the power supply and drive control signals of the seat control unit 10 may be transmitted to the second heater mat 210, the second ventilation blower 220, the reclining adjustment motor 231, the swivel motor 232, and the like, which are the electric parts of the motor-driven child seat, through the first connector 140 and the second connector 240.

Figure 6:
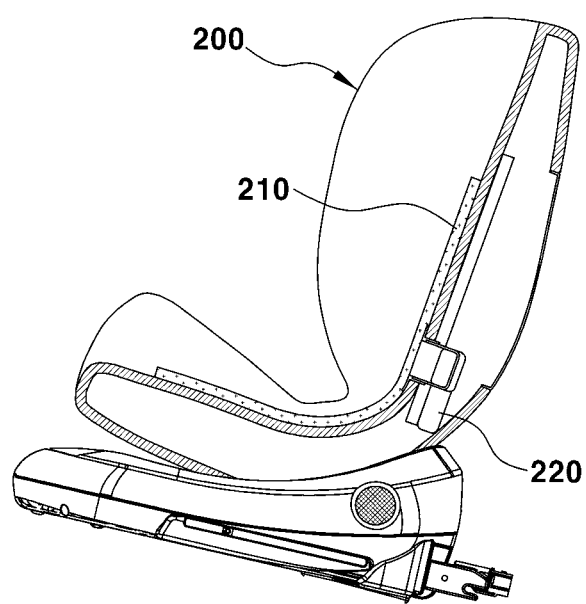
FIG. 6 is a side cross-sectional view showing an example of an electric part mounted on the motor-driven child seat for the vehicle according to an exemplary embodiment of the present disclosure.

For example, when the second connector 240 of the motor-driven child seat 200 is conductively inserted into and fastened to the first connector 140 of the vehicle seat, the power supply and drive control signals of the seat control unit 10 may be transmitted to the second heater mat 210 and the second ventilation blower 220 of the electric child seat 200 shown in FIG. 6.

Meanwhile, the seat control unit 10 is configured to determine whether the first connector 140 and the second connector 240 are fastened to transmit the power supply and drive control signal to the electric parts of the motor-driven child seat only when the first connector 140 and the second connector 240 are reliably fastened.

To the present end, as shown in FIG. 1, the first connector 140 is provided with a 1-1st detection pin 31 connected to the first sheet control unit 11 by a conductive line 11-1 and a 1-2nd detection pin 32 connecting the first seat control unit 11 and a ground line 11-2, and as shown in FIG. 1, the second connector 240 is provided with a second detection pin 42 conductively coming into contact with the 1-1st detection pin 31 and the 1-2nd detection pin 32.

Accordingly, when the 1-1st detection pin 31 and the 1-2nd detection pin 32 of the first connector 140 conductively come into contact with the second detection pin 42 of the second connector 240, the first seat control unit 11 may determine that the first connector 140 and the second connector 240 are conductively reliably fastened when detecting a ground signal from a ground line 11-2.

On the other hand, when the first seat control unit 11 does not detect the ground signal when the 1-1st detection pin 31 and the 1-2nd detection pin 32 of the first connector 140 conductively come into contact with the second detection pin 42 of the second connector 240, the first seat control unit 11 determines that the first connector 140 and the second connector 240 have not been fastened.

Meanwhile, when the second seat control unit 12 receives a door opening signal of a door switch 24 and at the same time, receives a vehicle stop signal of a vehicle speed sensor 25 from the CAN bus 22, the second seat control unit 12 is configured to transmit the power supply and drive control signals for rotating the motor-driven child seat toward the door to the swivel motor 232 of the motor-driven child seat 200.

Figure 7:
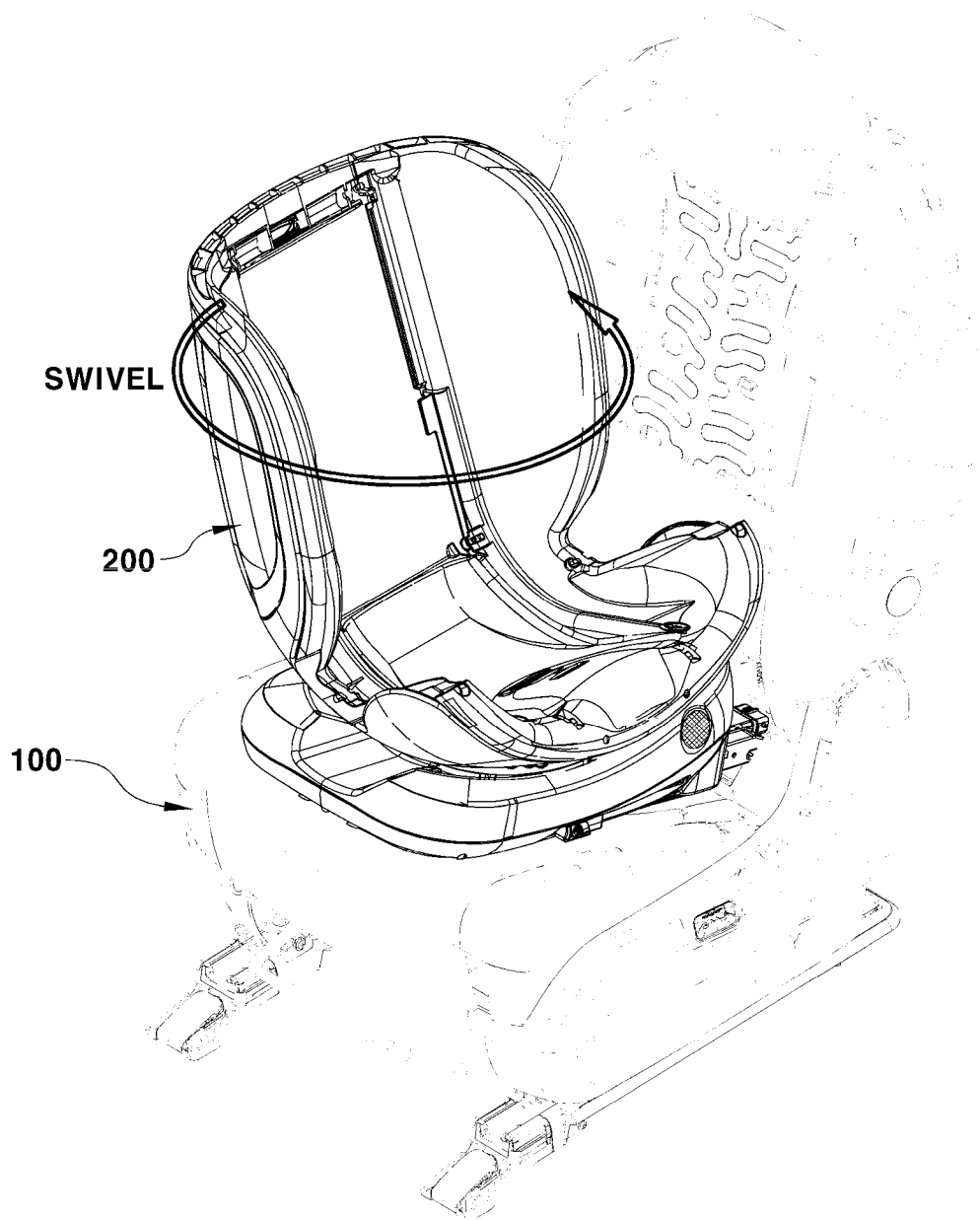
FIG. 7 is a perspective view showing a swivel state of the motor-driven child seat for the vehicle according to an exemplary embodiment of the present disclosure.

Accordingly, because the motor-driven child seat 200 may be rotated in the door opening direction (getting-on/off direction) by the driving of the swivel motor 232 as shown in FIG. 7, it is possible to provide the convenience for children to sit on or get off the motor-driven child seat.

On the other hand, when the second seat control unit 12 receives a door closing signal of the door switch 24 from the CAN bus 22 and at the same time, receives a vehicle speed detection signal of more than 0 km/h from the vehicle speed sensor 24 from the CAN bus 22, the second seat control unit 12 is configured to transmit the power supply and drive control signals for rotating the motor-driven child seat 200 toward the front of the vehicle to the swivel motor 232 to guarantee a safe sitting state of children.

Meanwhile, a separate control unit may also be built in the motor-driven child seat 200 to perform an individual operation control for the electric parts including the second heater mat 210, the second ventilation blower 220, the reclining adjustment motor 231, the swivel motor 232, and the like.

Here, various embodiments of the example of controlling the motor-driven child seat according to an exemplary embodiment of the present disclosure according to the above configuration will be referred to as follows.

Figure 8:
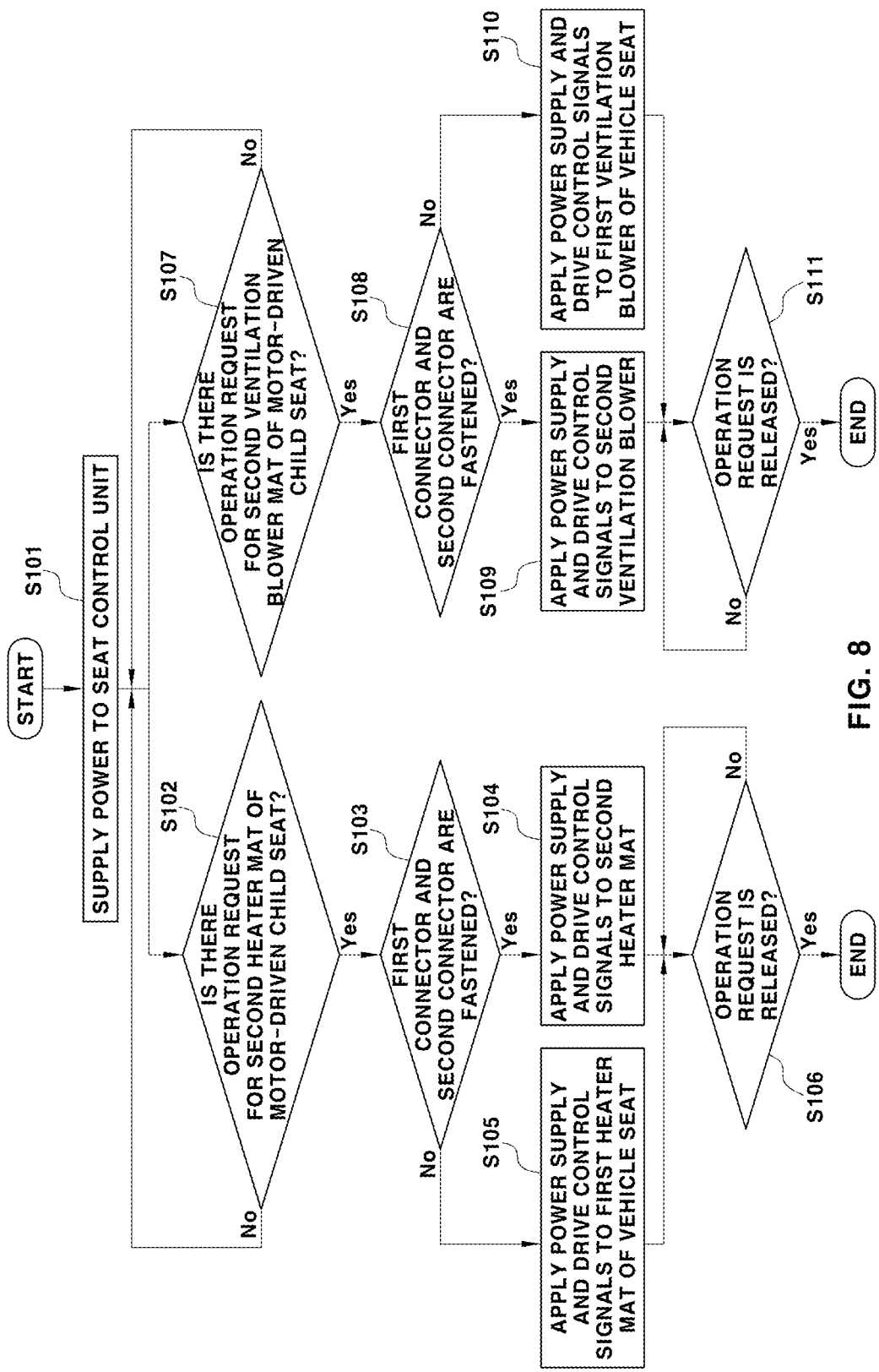
FIG. 8 is a flowchart showing an example of a method of controlling the motor-driven child seat for the vehicle according to an exemplary embodiment of the present disclosure.

FIG. 8 is a flowchart showing an example of a method of controlling the motor-driven child seat for the vehicle according to an exemplary embodiment of the present disclosure.

First, a battery power source for control activation is supplied to the seat control unit 10 according to the ignition-on of the vehicle (S101).

Next, the seat control unit 10 determines whether there is an operation request for the electric parts of the vehicle seat 100 or the electric parts of the motor-driven child seat 200 from the operation request unit 20.

For example, the seat control unit 10 may determine whether there is an operation request for the second heater mat 210 for heating among the electric parts of the motor-driven child seat (S102), or determine whether there is an operation request for the second ventilation blower 220 for cooling among the electric parts of the motor-driven child seat (S107).

As the determination result in operation S102, when there is the operation request for the second heater mat 210, the seat control unit 10 determines whether the first connector 140 mounted on the vehicle seat 100 and the second connector 240 mounted on the motor-driven child seat 200 are fastened (S103), and likewise, as the determination result in operation S107, even when there is the operation request for the second ventilation blower 220, the seat control unit 10 determines whether the first connector 140 and the second connector 240 are fastened (S108).

When there is the operation request for the electric parts of the vehicle seat 100 from the operation request unit 20, the seat control unit 10 applies the power supply and drive control signal to the electric parts of the vehicle seat.

At the present time, as described above, when the 1-1st detection pin 31 and the 1-2nd detection pin 32 of the first connector 140 conductively come into contact with the second detection pin 42 of the second connector 240, the first seat control unit 11 of the seat control unit 10 may determine that the first connector 140 and the second connector 240 are conductively fastened when detecting the ground signal from the ground line 11-2.

On the other hand, when the first seat control unit 11 does not detect the ground signal when the 1-1st detection pin 31 and the 1-2nd detection pin 32 of the first connector 140 conductively come into contact with the second detection pin 42 of the second connector 240, the first seat control unit 11 determines that the first connector 140 and the second connector 240 have not been fastened.

Subsequently, when it is determined that the first connector 140 and the second connector 240 have been fastened, the seat control unit 10 applies the power supply and drive control signals to the electric parts of the motor-driven child seat 200, and on the other hand, when it is determined that the first connector 140 and the second connector 240 have not been fastened, the seat control unit 10 applies the power supply and drive control signals to the electric parts of the vehicle seat 100.

For example, when there is the operation request for the second heater mat 210 among the electric parts of the motor-driven child seat 200, the power supply and drive control signals are applied to the second heater mat 210 of the motor-driven child seat 200 when the first connector 140 and the second connector 240 are in a state of being fastened (S104), and the power supply and drive control signals are applied to the first heater mat 110 of the vehicle seat 100 when the first connector 140 and the second connector 240 are in a state of not being fastened (S105).

Accordingly, the second heater mat 210 among the electric parts of the motor-driven child seat 200 is operated in the state in which the first connector 140 and the second connector 240 have been fastened, so that it is possible to provide a comfortable seating environment for children by relieving the discomfort of children sitting on the child seat who feel cold.

On the other hand, even when the first connector 140 and the second connector 240 are in the state of not being fastened, the first heater mat 110 of the vehicle seat 100 is operated, so that it is possible to provide the indirect heating effect to children sifting on the child seat.

For example, when there is the operation request for the second ventilation blower 220 among the electric parts of the motor-driven child seat 200, the power supply and drive control signals are applied to the second ventilation blower 220 of the motor-driven child seat 200 when the first connector 140 and the second connector 240 are in the state of being fastened (S109), and the power supply and drive control signals are applied to the first ventilation blower 120 of the vehicle seat 100 when the first connector 140 and the second connector 240 are in the state of not being fastened (S110).

Accordingly, the second ventilation blower 220 among the electric parts of the motor-driven child seat 200 is operated in the state in which the first connector 140 and the second connector 240 have been fastened, so that it is possible to relieve discomfort such as sweating or feeling hot in the child's body by the ventilation air discharged toward the child's body, and provide a comfortable seating environment for children.

On the other hand, the first ventilation blower 120 of the vehicle seat 100 is operated even when the first connector 140 and the second connector 240 are in the state of not being fastened, so that it is possible to provide the indirect cooling effect to children sitting on the child seat.

Meanwhile, the operation of the corresponding electric part is terminated when there is a release request from the operation request unit by confirming whether there is the release for the operation request for the electric part of the motor-driven child seat (S106 and S111).

Figure 9:
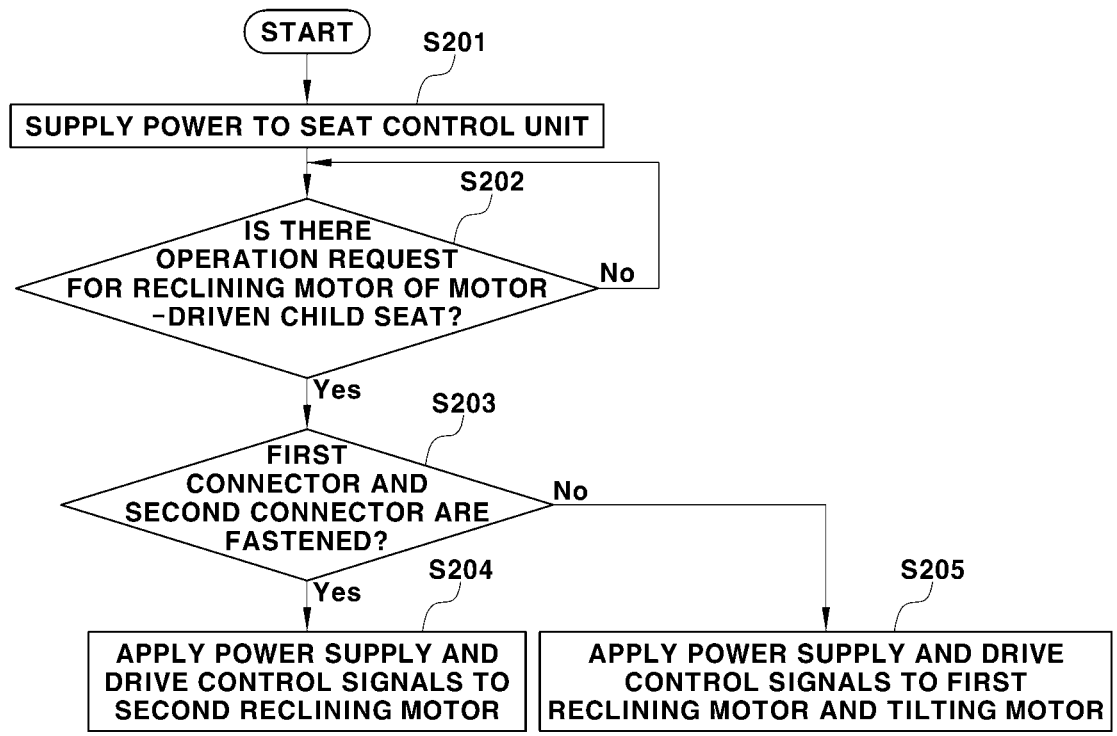
FIG. 9 is a flowchart showing another example of the method of controlling the motor-driven child seat for the vehicle according to an exemplary embodiment of the present disclosure.

FIG. 9 is a flowchart showing another example of the method of controlling the motor-driven child seat for the vehicle according to an exemplary embodiment of the present disclosure.

First, a battery power source for control activation is supplied to the seat control unit 10 according to the ignition-on of the vehicle (S201).

Next, the seat control unit 10 determines whether there is an operation request for the electric parts of the vehicle seat 100 or the electric parts of the motor-driven child seat 200 from the operation request unit 20.

For example, the seat control unit 10 determines whether there is the operation request for the reclining adjustment motor 231 of the motor-driven child seat 200 among the electric parts of the motor-driven child seat (S202).

As the determination result in operation S202, when there is the operation request for the reclining adjustment motor 231 of the motor-driven child seat 200, the seat control unit 10 determines whether the first connector 140 mounted on the vehicle seat 100 and the second connector 240 mounted on the motor-driven child seat 200 are fastened (S203).

Subsequently, when there is the operation request for the reclining adjustment motor 231 of the motor-driven child seat 200 and the first connector 140 and the second connector 240 are in the state of being fastened, the power supply and drive control signals are applied to the reclining adjustment motor 231 of the motor-driven child seat 200 (S204).

Accordingly, the forward-rearward angle adjustment of the motor-driven child seat 200 is performed by operation of the reclining adjustment motor 231 of the motor-driven child seat 200, so that it is possible to provide the convenience of seating and convenience of switching to a comfortable posture for children.

On the other hand, when the first connector 140 and the second connector 240 are not in the state of being fastened, the power supply and drive control signals are applied to the reclining adjustment motor 131 and the seat cushion tilting motor 133 for adjusting the angle of the seatback of the vehicle seat 100 (S205).

Accordingly, when there is the operation request for the reclining adjustment motor 231 of the motor-driven child seat 200, the reclining adjustment for the seatback of the vehicle seat is performed by operation of the reclining adjustment motor 131 and the tilting motor 133 of the vehicle seat 200 even when the first connector 140 and the second connector 240 are in the state of not being fastened, and at the same time, the reclining adjustment may be performed together with the motor-driven child seat mounted on the vehicle seat when the tilting adjustment of the seat cushion is performed, so that it is possible to provide the convenience of seating and convenience of switching to a comfortable posture for children.

FIG. 10 is a flowchart showing yet another example of the method of controlling the motor-driven child seat for the vehicle according to an exemplary embodiment of the present disclosure.

First, a battery power source for control activation is supplied to the seat control unit 10 according to the ignition-on of the vehicle (S201).

Next, the second seat control unit 12 of the seat control unit 10 determines whether the door opening signal is received from the door switch 24 and at the same time, the vehicle stop signal of the vehicle speed sensor 25 is received from the CAN bus 22 of the operation request unit 20 (S302).

For reference, typically, the door panel is provided with the door switch configured to detect the opened or closed state of the door as the door panel is pressed when the door is closed.

As the determination result in operation S302, when the second seat control unit 12 receives the door opening signal of the door switch 24 and at the same time, receives the vehicle stop signal of the vehicle speed sensor 25 from the CAN bus 22, the second seat control unit 12 applies the power supply and drive control signals for rotating the motor-driven child seat toward the door to the swivel motor 232 of the motor-driven child seat 200 (S303).

Accordingly, when the door is open and the vehicle stops, the motor-driven child seat is automatically rotated toward the door open, so that it is possible to provide the convenience for children to sit on or get off the child seat.

Subsequently, after a certain time, the second seat control unit 12 determines whether the door closing signal is received from the door switch 24 and at the same time, the vehicle speed detection signal of more than 0 km/h is received from the vehicle speed sensor 25 from the CAN bus 22 of the operation request unit 20 (S304).

As the determination result in operation S304, when the second seat control unit 12 receives the door closing signal of the door switch 24 and at the same time, receives the vehicle speed detection signal of more than 0 km/h from the vehicle speed sensor 25 from the CAN bus 22, the second seat control unit 12 applies the power supply and drive control signals for rotating the motor-driven child seat toward the front of the vehicle to the swivel motor 232 of the motor-driven child seat 200 (S305).

Accordingly, the motor-driven child seat may be automatically rotated toward the front of the vehicle again when the door is closed and the vehicle speed is detected for safety and observation of children accommodated on the child seat.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for controlling a motor-driven child seat for a vehicle, the system comprising:
   a seat controller of power supply and drive control for electric parts of a vehicle seat or electric parts of the motor-driven child seat, wherein the seat controller includes a processor;
   a plurality of operation request units connected to an input terminal of the seat controller;
   a first connector mounted on the vehicle seat, and connected to an output terminal of the seat control unit; and
   a second connector mounted on the motor-driven child seat, and connected to an input terminal of an electric part of the motor-driven child seat,
   wherein when the first connector and the second connector are fastened to each other, power supply and drive control signals are transmitted to the electric parts of the motor-driven child seat from the seat controller.

2. The system of claim 1, wherein the seat controller is configured for:
   determining whether there is an operation request for the electric parts of the vehicle seat or the electric parts of the motor-driven child seat;
   determining whether the first connector mounted on the vehicle seat and the second connector mounted on the motor-driven child seat are fastened when the seat controller concludes that there is the operation request;
   applying the power supply and drive control signals to the electric parts of the motor-driven child seat when the seat controller concludes that the first connector and the second connector have been fastened to each other; and
   applying the power supply and drive control signals to the electric parts of the vehicle seat when the seat controller concludes that the first connector and the second connector have not been fastened.

3. The system of claim 1, wherein when there is an operation request for a second heater mat or a second ventilation blower among the electric parts of the motor-driven child seat, the power supply and drive control signals are applied to the second heater mat or the second ventilation blower of the motor-driven child seat when the first connector and the second connector are in a state of being fastened, and the power supply and drive control signals are applied to a first heater mat or a first ventilation blower among the electric parts of the vehicle seat when the first connector and the second connector are in a state of not being fastened.

4. The system of claim 1, wherein when there is an operation request for a reclining adjustment motor among the electric parts of the motor-driven child seat, the power supply and drive control signals are applied to the reclining adjustment motor of the motor-driven child seat when the first connector and the second connector are in a state of being fastened, and the power supply and drive control signals are applied to a seatback reclining adjustment motor and a seat cushion tilting motor among the electric parts of the vehicle seat when the first connector and the second connector are in a state of not being fastened.

5. The system of claim 1, wherein the plurality of operation request units include:
   a vehicle switch directly operable by a driver;
   a CAN bus connected to the seat controller and configured to transmit a voice signal and a vehicle information detection signal to the seat controller; and
   a smart device connected to the seat controller of wireless communication.

6. The system of claim 1, wherein the seat controller includes:
   a first seat controller configured to transmit the power supply and drive control signals to a second heater mat and a second ventilation blower mounted on the motor-driven child seat among the electric parts of the motor-driven child seat in addition to a first heater mat and a first ventilation blower mounted on the vehicle seat among the electric parts of the vehicle seat, and determine whether the first connector and the second connector are fastened to each other; and
   a second seat controller configured to transmit the power supply and drive control signals to a reclining adjustment motor and a swivel motor mounted on the motor-driven child seat among the electric parts of the motor-driven child seat in addition to a seat position adjustment motor mounted on the vehicle seat among the electric parts of the vehicle seat.

7. The system of claim 6, wherein the seat position adjustment motor includes at least one of a reclining adjustment motor configured to adjust an angle of a seatback of the seat, a seat sliding motor configured to adjust a forward-rearward position of the seat, and a seat cushion tilting motor configured to tilt a seat cushion of the seat.

8. The system of claim 6,
   wherein the first connector is provided with a 1-1st detection pin connected to the first seat controller by a conductive line and a 1-2nd detection pin connected to the first seat controller by a ground line, and
   wherein the second connector is provided with a second detection pin conductively coming into contact with the 1-1st detection pin and the 1-2nd detection pin.

9. The system of claim 8,
   wherein when the first seat controller detects a ground signal when the 1-1st detection pin and the 1-2nd detection pin of the first connector conductively come into contact with the second detection pin of the second connector, the first seat controller is configured to conclude that the first connector and the second connector have been conductively fastened.

10. The system of claim 6,
    wherein the plurality of operation request units include a door switch and a vehicle speed sensor electrically connected to the second seat controller, and
    wherein when the second seat controller receives a door opening signal from the door switch and receives a vehicle stop signal from the vehicle speed sensor, the second seat controller is configured to transmit the power supply and drive control signals for rotating the motor-driven child seat toward a door to the swivel motor.

11. The system of claim 10,
    wherein when the second seat controller receives a door closing signal from the door switch and receives a vehicle speed detection signal of more than 0 km/h from the vehicle speed sensor, the second seat controller is configured to transmit the power supply and drive control signals for rotating the motor-driven child seat toward a front of the vehicle to the swivel motor.

12. A method of controlling a motor-driven child seat for a vehicle, the method comprising:
    supplying power to a seat controller including a processor;
    determining, by the seat controller, whether there is an operation request for electric parts of a vehicle seat or electric parts of the motor-driven child seat;
    determining, by the seat controller, whether a first connector mounted on the vehicle seat and a second connector mounted on the motor-driven child seat are fastened when the seat controller concludes that there is the operation request;
    applying, by the seat controller, power supply and drive control signals to the electric parts of the motor-driven child seat when the seat controller concludes that the first connector and the second connector have been fastened to each other; and
    applying, by the seat controller, the power supply and drive control signals to the electric parts of the vehicle seat when the seat controller concludes that the first connector and the second connector have not been fastened.

13. The method of claim 12,
    wherein when the seat controller detects a ground signal when a 1-1st detection pin and a 1-2nd detection pin of the first connector conductively come into contact with a second detection pin of the second connector, the seat controller is configured to conclude that the first connector and the second connector have been conductively fastened.

14. The method of claim 13,
wherein when the seat controller does not detect the ground signal when the 1-1st detection pin and the 1-2nd detection pin of the first connector conductively come into contact with the second detection pin of the second connector, the seat controller is configured to conclude that the first connector and the second connector have not been fastened.

15. The method of claim 12,
wherein when there is an operation request for a second heater mat or a second ventilation blower among the electric parts of the motor-driven child seat, the power supply and drive control signals are applied to the second heater mat or the second ventilation blower of the motor-driven child seat when the first connector and the second connector are in a state of being fastened, and the power supply and drive control signals are applied to a first heater mat or a first ventilation blower of the vehicle seat when the first connector and the second connector are in a state of not being fastened.

16. The method of claim 12,
wherein when there is an operation request for a reclining adjustment motor among the electric parts of the motor-driven child seat, the power supply and drive control signals are applied to the reclining adjustment motor of the motor-driven child seat when the first connector and the second connector are in a state of being fastened, and the power supply and drive control signals are applied to a seatback reclining adjustment motor and a seat cushion tilting motor of the vehicle seat when the first connector and the second connector are in a state of not being fastened.

17. The method of claim 16, wherein the seat position adjustment motor includes at least one of a reclining adjustment motor configured to adjust an angle of a seatback of the seat, a seat sliding motor configured to adjust a forward-rearward position of the seat, and a seat cushion tilting motor configured to tilt a seat cushion of the seat.

18. The method of claim 12,
wherein when the seat controller receives a door opening signal from a door switch and receives a vehicle stop signal from a vehicle speed sensor, the seat controller is configured to apply the power supply and drive control signals for rotating the motor-driven child seat toward a door to a swivel motor of the motor-driven child seat.

19. The method of claim 18,
wherein when the seat controller receives a door closing signal from the door switch and receives a vehicle speed detection signal of more than 0 km/h from the vehicle speed sensor, the seat controller is configured to apply the power supply and drive control signals for rotating the motor-driven child seat toward a front of the vehicle to the swivel motor of the motor-driven child seat.

* * * * *